(12) United States Patent
McDaniel

(10) Patent No.: US 10,108,025 B1
(45) Date of Patent: Oct. 23, 2018

(54) EYEGLASS HOLDING DEVICE

(71) Applicant: Robin McDaniel, Panama City Beach, FL (US)

(72) Inventor: Robin McDaniel, Panama City Beach, FL (US)

(*) Notice: Subject to any disclaimer, the term of this patent is extended or adjusted under 35 U.S.C. 154(b) by 0 days.

(21) Appl. No.: 15/792,429

(22) Filed: Oct. 24, 2017

(51) Int. Cl.
*G02C 3/00* (2006.01)
*A45F 5/00* (2006.01)

(52) U.S. Cl.
CPC .............. *G02C 3/006* (2013.01); *A45F 5/00* (2013.01)

(58) Field of Classification Search
CPC . G02C 3/003; G02C 3/006; A45F 2200/0541; Y10T 24/1371
USPC ..................................... D16/339
See application file for complete search history.

(56) References Cited

U.S. PATENT DOCUMENTS

| 2,539,922 | A | * | 1/1951 | Nyberg | .................. | G02C 3/003 |
|           |   |   |        |        |                    | 2/11       |
| 5,690,446 | A | * | 11/1997 | Poissant | ................ | A63H 33/10 |
|           |   |   |        |          |                  | 403/169    |
| 8,092,009 | B2 | * | 1/2012 | Williams | ............... | G02C 3/003 |
|           |    |   |        |          |                 | 351/156    |
| 2013/0077043 | A1 | * | 3/2013 | Moran | ..................... | G02C 5/02 |
|              |    |   |        |       |                      | 351/118   |

* cited by examiner

*Primary Examiner* — Adam Waggenspack
(74) *Attorney, Agent, or Firm* — Gulf Coast Intellectual Property Group

(57) ABSTRACT

An eyeglass holding device that is configured to releasably secure a pair of eyeglasses to a user such that the eyeglasses can be mounted around a user's neck when not in use. The eyeglass holding device includes an elongate body member having a first end and a second end. A first connection housing is integrally formed to the first end and a second connection housing is integrally formed to the second end of the elongate body member. The first connection housing and the second connection housing include an interior volume having an opening providing access thereto. A first receiving stud member is disposed in the first connection housing. A second receiving stud member is disposed in the second connection housing. A first connection member is configured to mateably secure to the first receiving stud member. A second connection member is configured to mateably secure to the second receiving stud member.

17 Claims, 2 Drawing Sheets

EYEGLASS HOLDING DEVICE

FIELD OF THE INVENTION

The present invention relates generally to eyewear accessories, more specifically but not by way of limitation, an eyeglass holding device that is configured to surroundably mount a user's neck so as to provide either retention of the eyeglasses and further prevent the falling of eyeglasses as a result of certain movements.

BACKGROUND

Numerous styles of eyeglasses are worn by millions of people everyday. Eyeglasses range from prescription eyewear required to provide corrective vision to sunglasses. The styles of eyeglasses are almost limitless but all eyeglasses include temple stems and earpiece tips that function to provide retention of the desired position of the eyeglasses on a wearers face. Depending on the type of eyeglasses being worn and the situational use thereof, many users may find it useful to remove the eyeglasses temporarily but wish to have the eyeglasses remain proximate to them for subsequent convenient re-donning thereof.

While some users will place eyeglasses in a case, others prefer to releasably secure the eyeglasses to their body for quick access thereto. Eyeglass chains or straps are commonly utilized and these devices are secured to either the temple stem or the earpiece and extend around the neck of the user. These devices allow a user to temporarily hang the eyeglasses in a suspended position around their neck. One problem with these devices is their ability to maintain a consistent engagement with the temple stem or earpiece. Many existing devices utilize material that is elastic in manner to provide coupling with either the earpiece and/or a portion of the temple stem. This technique has proven to be ineffective over time as the elasticity of the material decreases. Additionally, the design is limited in the size of the temple stem and/or earpiece that can be retained with smaller slimmer temple stem and earpiece designs being difficult to retain.

Accordingly, there is a need for a eyeglass holding device that includes a replaceable connection member wherein the connection member is structured to provide improved retention of a pair of eyeglasses.

SUMMARY OF THE INVENTION

It is the object of the present invention to provide an eyeglass holding device that is configured to releasably retain a pair of eyeglasses wherein the eyeglass holding device includes an elongate body member.

Another object of the present invention is to provide an eyeglass holding device operable to surroundably mount a user's neck wherein the elongate body member includes a first end and a second end.

A further object of the present invention is to provide an eyeglass holding device that is configured to releasably retain a pair of eyeglasses wherein the elongate member is provided in various lengths.

An additional object of the present invention is to provide an eyeglass holding device operable to surroundably mount a user's neck that includes a first connection housing integrally formed on the first end of the elongate body member.

Yet a further object of the present invention is to provide an eyeglass holding device that is configured to releasably retain a pair of eyeglasses that includes a second connection housing integrally formed on the second end of the elongate body member.

A further object of the present invention is to provide an eyeglass holding device operable to surroundably mount a user's neck wherein the first connection housing and the second connection housing include an interior volume and an opening providing access thereto.

Another object of the present invention is to provide an eyeglass holding device that is configured to releasably retain a pair of eyeglasses that further includes a first receiving stud member disposed in the interior volume of the first connection housing.

Still an additional object of the present invention is to provide an eyeglass holding device operable to surroundably mount a user's neck that further includes a second receiving stud member disposed in the interior volume of the second connection housing.

Yet an alternative object of the present invention is to provide an eyeglass holding device that is configured to releasably retain a pair of eyeglasses that further includes a first connection member wherein the first connection member is releasably secured to the first receiving stud member and is further configured to extend outward therefrom and releasably secure to a portion of an eyeglass.

Another object of the present invention is to provide an eyeglass holding device operable to surroundably mount a user's neck that further includes a second connection member wherein the second connection member is releasably secured to the second receiving stud member and is further configured to extend outward therefrom and releasably secure to a portion of an eyeglass.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
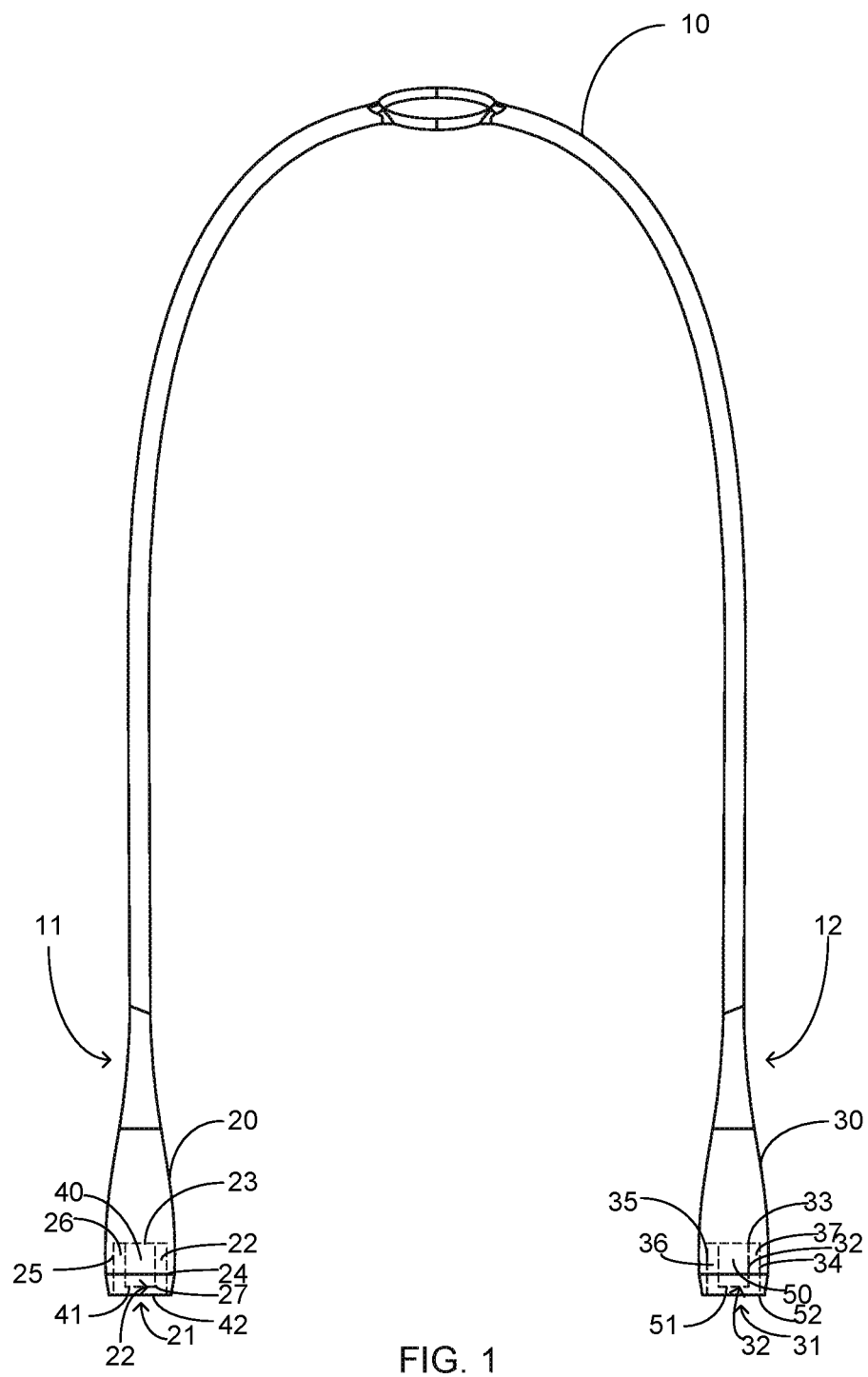
FIG. 1 is a perspective view of a preferred embodiment of the present invention.
Figure 2:
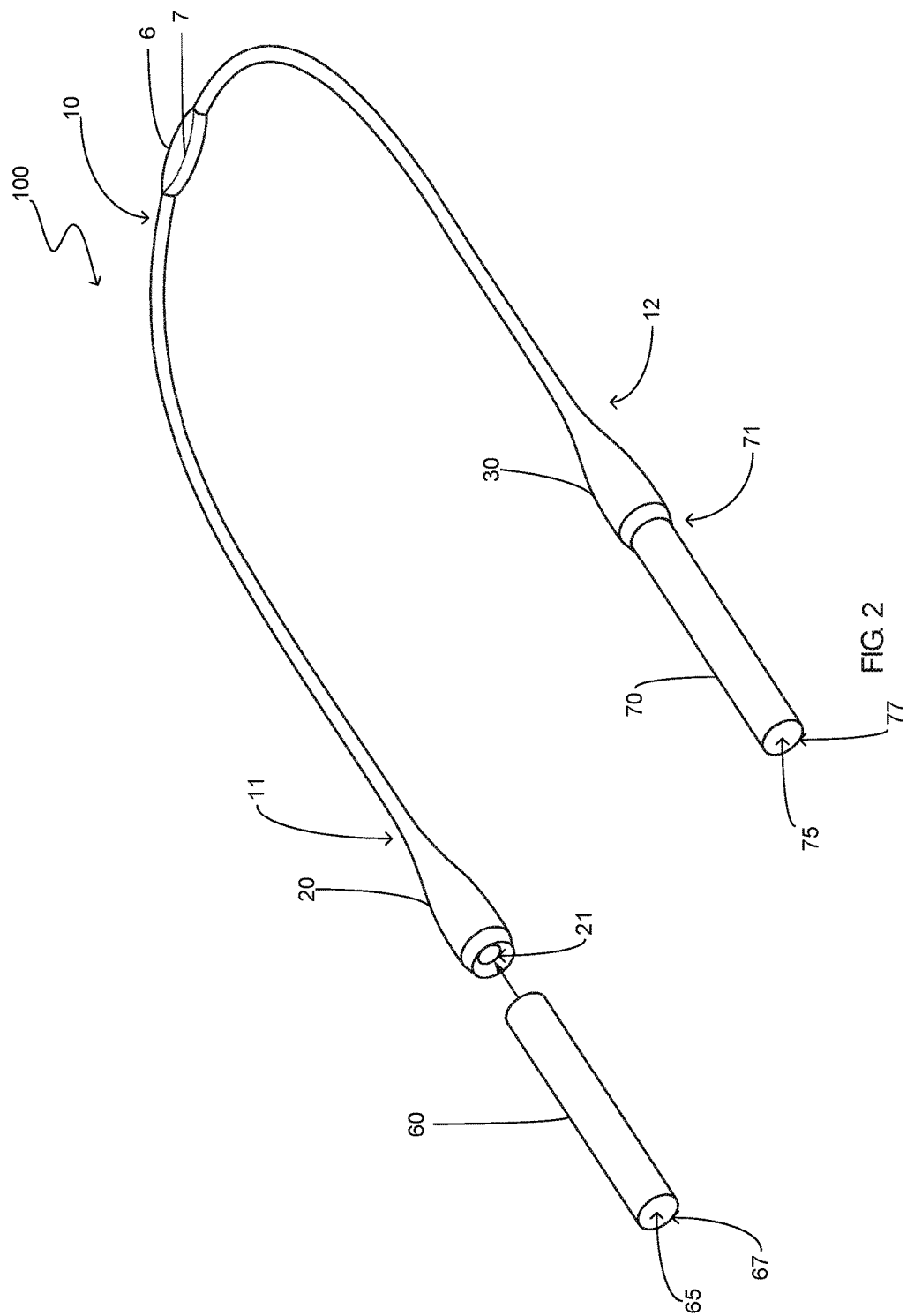
FIG. 2 is a top view of the present invention.

Referring now to the drawings submitted herewith, wherein various elements depicted therein are not necessarily drawn to scale and wherein through the views and figures like elements are referenced with identical reference numerals, there is illustrated a eyeglass holding device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the eyeglass holding device 100 includes an elongate body member 10. The elongate body member is generally tubular in shape having a first end 11 and second end 12. While the elongate body member 10 is illustrated as being tubular in shape herein, it is contemplated within the scope of the present invention that the elongate body member 10 could be formed in alternate shapes. It is further contemplated within the scope of the present invention that the elongate body member 10 could be manufactured in various alternate lengths. The elongate body member 10 is manufactured to a sufficient length so as to engage a conventional pair of eyeglasses and surroundably mount a user's neck. It should also be recognized by those skilled in the art that the elongate body member 10 could be provided in various colors. While it is contemplated within the scope of the present invention that the elongate body member 10 could be manufactured from various suitable materials, good results have been achieved utilizing a rubber product such as but not limited to Hytrel rubber. Located approximately at the midpoint of the elongate body member 10 is indicia area 6. Indicia area 6 is integrally formed with the elongate body member 10 and is planar in manner having a surface area 7. Surface area 7 provides an suitable surface area for indicia such as but not limited to a logo. It is contemplated within the scope of the present invention that the indicia area 6 could be manufactured in alternates shapes and sizes and still achieve the desired objective of providing a surface area 7 suitable for display of text such as but not limited to a logo thereon.

Integrally formed with the first end 11 and the second end 12 are the first connection housing 20 and second connection housing 30. The first connection housing 20 and second connection housing 30 are integrally formed utilizing suitable techniques. The first connection housing 20 and second connection housing 30 have a diameter that is greater than that of the elongate body member 10 for reasons further discussed herein. The first connection housing 20 includes opening 21 configured to provide access to the interior volume 22. The interior volume 22 has bottom surface 23 and opposing sidewalls 24,25 defining the size of the interior volume 22. Disposed within the interior volume 22 of the first connection housing 20 is the first receiving stud member 40. The first receiving stud member 40 is contiguously formed with the bottom surface 23 and extends outward therefrom towards opening 21. The end 41 of the first receiving stud member 40 is positioned such that the end 41 is disposed within the interior volume 22 proximate the perimeter edge 42. The first receiving stud member 40 is cylindrical in shape and is formed so as to mateably couple with the first connection member 60 as will be further discussed herein. While the first receiving stud member 40 is illustrated herein as being cylindrical in shape so as to mateably couple with the tubular shaped first connection member 60, it is contemplated within the scope of the present invention that the first receiving stud member 40 could be formed in alternate shapes in order to mateably couple with the first connection member 60 that could be formed in an alternate shape. Intermediate the opposing sidewalls 24, 25 are voids 26,27. Voids 26, 27 function to allow the first connection member 60 to be inserted into the interior volume 22 such that the end 61 is adjacent bottom surface 23. It is contemplated within the scope of the present invention that the first connection housing 20 and the first receiving stud member 40 could be manufactured in numerous alternate sizes. It should be further understood that the first receiving stud member 40 could be provided in alternate lengths so as to accomplish the desired objective stated herein.

The second connection housing 30 includes opening 31 configured to provide access to the interior volume 32. The interior volume 32 has bottom surface 33 and opposing sidewalls 34,35 defining the size of the interior volume 32. Disposed within the interior volume 32 of the second connection housing 30 is the first receiving stud member 50. The second receiving stud member 50 is contiguously formed with the bottom surface 33 and extends outward therefrom towards opening 31. The end 51 of the second receiving stud member 50 is positioned such that the end 51 is disposed within the interior volume 32 proximate the perimeter edge 52. The second receiving stud member 50 is cylindrical in shape and is formed so as to mateably couple with the second connection member 70 as will be further discussed herein. While the second receiving stud member 50 is illustrated herein as being cylindrical in shape so as to mateably couple with the tubular shaped second connection member 70, it is contemplated within the scope of the present invention that the second receiving stud member 50 could be formed in alternate shapes in order to mateably couple with the second connection member 70 that could be formed in an alternate shape. Intermediate the opposing sidewalls 34, 35 are voids 36,37. Voids 36, 37 function to allow the second connection member 70 to be inserted into the interior volume 32 such that the end 71 is adjacent bottom surface 33. It is contemplated within the scope of the present invention that the second connection housing 30 and the second receiving stud member 50 could be manufactured in numerous alternate sizes. It should be further understood that the second receiving stud member 50 could be provided in alternate lengths so as to accomplish the desired objective stated herein.

The first connection member 60 and second connection member 70 are releasably secured to the first connection housing 20 and second connection housing 30 respectively. The first connection member 60 and second connection member 70 are tubular in shape having passage 65,75 respectively extending therethrough. The first connection member 60 and second connection member 70 are designed to be releasably secured to the first receiving stud member 40 and the second stud receiving member 50 respectively and maintain a frictional engagement therewith. The openings 67,77 of the first connection member 60 and second connection member 70 are of suitable size to as to accommodate therethrough a portion of temple stem and/or earpiece of an eyeglass so as to releasably secure thereto. The first connection member 60 and second connection member 70 provide a replaceable technique to releasably secure eyeglasses to the eyeglass holding device 100. This replaceable technique is desirable for eventual wearing out of the first connection member 60 and second connection member 70 and also to facilitate changes desired for fashion preferences wherein the first connection member 60 and second connection member 70 are available in numerous colors. While no length for the first connection member 60 and second connection member 70 is required, good results have been achieved by utilizing a first connection member 60 and second connection member 70 that are approximately one and a half inch in length. The first connection member 60 and second connection member 70 are manufactured from a suitable expandable material such as but not limited to latex tubing.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An eyeglass holding device that is configured to releasably secure eyeglasses to a user comprising:
    an elongate body member, said elongate body member having a first end and a second end;
    a first connection housing, said first connection housing being integrally formed with said first end of said elongate body member, said first connection housing having an opening providing access to an interior volume, said interior volume having a bottom surface;
    a first receiving stud member, said first receiving stud member being disposed within said interior volume of said first connection housing, said first receiving stud member extending upward from said bottom surface of said interior volume, said first receiving stud member having a first end and a second end, said first receiving stud member having a consistent diameter intermediate said first end and said second end thereof;
    a second connection housing, said second connection housing being integrally formed with said second end of said elongate body member, said second connection housing having an opening providing access to an interior volume, said interior volume having a bottom surface;
    a second receiving stud member, said second receiving stud member being disposed within said interior volume of said second connection housing, said second receiving stud member extending upward from said bottom surface of said interior volume of said second connection housing, said second receiving stud member having a first end and a second end, said second receiving stud member having a consistent diameter intermediate said first end and said second end thereof.

2. The eyeglass holding device as recited in claim 1, and further including a first connection member, said first connection member having a first end and a second end, said first end of said first connection member configured to releasably secure to said first receiving stud member, said first connection member being manufactured from an elastic material configured to receive a portion of a temple of an eyeglass having alternate sizes.

3. The eyeglass holding device as recited in claim 2, and further including a second connection member, said second connection member having a first end and a second end, said first end of said second connection member configured to releasably secure to said second receiving stud member said second connection member being manufactured from an elastic material configured to receive a portion of a temple of an eyeglass having alternate sizes.

4. The eyeglass holding device as recited in claim 3, wherein said first connection member includes a hollow passage therethrough and wherein said second end of said first connection member is configured to releasably secure to a portion of the eyeglass.

5. The eyeglass holding device as recited in claim 4, wherein said second connection member includes a hollow passage therethrough and wherein said second end of said second connection member is configured to releasably secure to a portion of the eyeglass.

6. The eyeglass holding device as recited in claim 5, wherein the interior volume of said first connection housing further includes opposing sidewalls and wherein a void is present intermediate the first receiving stud member and the opposing sidewalls.

7. The eyeglass holding device as recited in claim 6, wherein the interior volume of said second connection housing further includes opposing sidewalls and wherein a void is present intermediate the second receiving stud member and the opposing sidewalls of the second connection housing.

8. The eyeglass holding device as recited in claim 7, wherein the first receiving stud member includes a first end distal to said bottom surface of the interior volume of the first connection housing wherein the first end of the first receiving stud member is disposed within the interior volume of the first connection housing.

9. The eyeglass holding device as recited in claim 8, wherein the second receiving stud member includes a first end distal to said bottom surface of the interior volume of the second connection housing wherein the first end of the second receiving stud member is disposed within the interior volume of the second connection housing.

10. An eyeglass holding device that is configured to releasably secure eyeglasses to a user through engagement of the earpiece of the eyeglass comprising:
    an elongate body member, said elongate body member having a first end and a second end, said elongate body member having a midpoint, said elongate member having a indicia area proximate said midpoint;

a first connection housing, said first connection housing being integrally formed with said first end of said elongate body member, said first connection housing having an opening providing access to an interior volume, said interior volume having a bottom surface, said interior volume further having opposing sidewalls, said first connection housing having a perimeter edge proximate said opening;

a first receiving stud member, said first receiving stud member being disposed within said interior volume of said first connection housing, said first receiving stud member extending upward from said bottom surface of said interior volume, said first receiving stud member being cylindrical in shape having a constant diameter intermediate a first end and a second end thereof;

a second connection housing, said second connection housing being integrally formed with said second end of said elongate body member, said second connection housing having an opening providing access to an interior volume, said interior volume having a bottom surface, said interior volume of said second connection housing further having opposing sidewalls, said second connection housing having a perimeter edge proximate said opening of said second connection housing;

a second receiving stud member, said second receiving stud member being disposed within said interior volume of said second connection housing, said second receiving stud member extending upward from said bottom surface of said interior volume of said second connection housing, said second receiving stud member being cylindrical in shape having a constant diameter intermediate a first end and a second end thereof;

a first connection member, said first connection member having a first end and a second end, said first end of said first connection member configured to releasably secure to said first receiving stud member, said second end of said first connection member operable to engage an earpiece of the eyeglass, wherein said first connection member includes a hollow passage therethrough and is tubular in shape and wherein said first connection member is manufactured from an elastic material so as to accommodate alternate sizes of temples of eyeglasses;

a second connection member, said second connection member having a first end and a second end, said first end of said second connection member configured to releasably secure to said second receiving stud member, said second end of said second connection member operable to engage an earpiece of the eyeglass, wherein said second connection member includes a hollow passage therethrough and is tubular in shape and wherein said second connection member is manufactured from an elastic material so as to accommodate alternate sizes of temples of eyeglasses.

11. The eyeglass holding device as recited in claim 10, wherein the first receiving stud member includes a first end distal to said bottom surface of the interior volume of the first connection housing wherein the first end of the first receiving stud member is adjacent the perimeter edge of the opening of the first connection housing and disposed within the interior volume of the first connection housing.

12. The eyeglass holding device as recited in claim 11, wherein the second receiving stud member includes a first end distal to said bottom surface of the interior volume of the second connection housing wherein the first end of the second receiving stud member is adjacent the perimeter edge of the opening of the second connection housing and disposed within the interior volume of the second connection housing.

13. An eyeglass holding device that is configured to releasably secure eyeglasses to a user through engagement of the earpiece of the eyeglass comprising:

an elongate body member, said elongate body member having a first end and a second end, said elongate body member having a midpoint, said elongate member having a indicia area proximate said midpoint;

a first connection housing, said first connection housing being integrally formed with said first end of said elongate body member, said first connection housing having an opening providing access to an interior volume, said interior volume having a bottom surface, said interior volume further having opposing sidewalls, said first connection housing having a perimeter edge proximate said opening;

a first receiving stud member, said first receiving stud member being disposed within said interior volume of said first connection housing, said first receiving stud member extending upward from said bottom surface of said interior volume, said first receiving stud member having a first end and a second end, said first end of said first receiving stud member proximate said bottom surface of said interior volume of said second connection housing, said first receiving stud member having a constant diameter intermediate said first end and said second end thereof and wherein said second end of said first receiving stud member being disposed within said interior volume of said second connection housing beneath said perimeter edge of said opening of said first connection housing;

a second connection housing, said second connection housing being integrally formed with said second end of said elongate body member, said second connection housing having an opening providing access to an interior volume, said interior volume having a bottom surface, said interior volume of said second connection housing further having opposing sidewalls, said second connection housing having a perimeter edge proximate said opening of said second connection housing;

a second receiving stud member, said second receiving stud member being disposed within said interior volume of said second connection housing, said second receiving stud member extending upward from said bottom surface of said interior volume of said second connection housing, said second receiving stud member having a first end and a second end, said first end of said second receiving stud member proximate said bottom surface of said interior volume of said second connection housing, said second receiving stud member having a constant diameter intermediate said first end and said second end thereof and wherein said second end of said second receiving stud member being disposed within said interior volume of said second connection housing beneath said perimeter edge of said opening of said second connection housing;

a first connection member, said first connection member having a first end and a second end, said first end of said first connection member configured to releasably secure to said first receiving stud member, said first connection member including a hollow passage therethrough, said second end of said first connection member operable to engage an earpiece of the eyeglass and wherein said first connection member is manufactured from an elastic material so as to accommodate alternate sizes of temples of eyeglasses;

a second connection member, said second connection member having a first end and a second end, said first end of said second connection member configured to releasably secure to said second receiving stud member, said second connection member including a hollow passage therethrough, said second end of said second connection member operable to engage an earpiece of the eyeglass and wherein said second connection member is manufactured from an elastic material so as to accommodate alternate sizes of temples of eyeglasses.

14. The eyeglass holding device as recited in claim 13, wherein said first receiving stud member is mateably shaped with said first connection member.

15. The eyeglass holding device as recited in claim 14, wherein said second receiving stud member is mateably shaped with said second connection member.

16. The eyeglass holding device as recited in claim 15, wherein the interior volume of said first connection housing further includes a void present intermediate the first receiving stud member and the opposing sidewalls of the interior volume of said first connection housing.

17. The eyeglass holding device as recited in claim 16, wherein the interior volume of said second connection housing further includes a void present intermediate the first receiving stud member and the opposing sidewalls of the interior volume of said second connection housing.

* * * * *